United States Patent [19]

Best

[11] Patent Number: 4,667,336
[45] Date of Patent: May 19, 1987

[54] AUTOMATIC DETECTION OF SEAT BELT USAGE

[75] Inventor: Robert H. Best, Greensboro

[73] Assignee: Burlington Industries, Inc., Greensboro, N.C.

[21] Appl. No.: 785,743

[22] Filed: Oct. 9, 1985

[51] Int. Cl.⁴ ............... B60R 22/02; B60R 21/00; G11B 31/00
[52] U.S. Cl. ............................... 377/15; 180/270; 280/801; 307/10 SB; 346/25; 340/52 E; 360/6
[58] Field of Search ............. 180/270, 271; 280/801; 340/52 E; 307/10 SB; 377/15; 346/25; 360/6

[56] References Cited

U.S. PATENT DOCUMENTS

| | | | |
|---|---|---|---|
| 3,624,601 | 11/1971 | Routzahn et al. | 340/52 E |
| 3,756,339 | 9/1973 | Cornelison, Jr. | 297/477 |
| 3,792,445 | 2/1974 | Bucks et al. | 360/6 |
| 3,831,140 | 8/1974 | Anderson, Jr. | 340/52 E |
| 3,864,668 | 2/1975 | Bickford | 340/52 E |
| 3,864,731 | 2/1975 | Callahan | 346/25 |
| 3,866,167 | 2/1975 | Hirano | 340/52 E |
| 3,904,884 | 9/1975 | Uota | 307/10 SB |
| 3,934,123 | 1/1976 | Maurer et al. | 377/15 |
| 4,395,624 | 7/1983 | Wartski | 377/15 |

*Primary Examiner*—John S. Heyman
*Attorney, Agent, or Firm*—Cushman, Darby & Cushman

[57] ABSTRACT

A method and apparatus for encouraging driver's seat belt usage includes a system for detecting and recording each time a seat belt is used. Depending on the level of seat belt usage the driver earns discounts on car insurance premiums.

5 Claims, 3 Drawing Figures

4,667,336

AUTOMATIC DETECTION OF SEAT BELT USAGE

FIELD OF THE INVENTION

The invention is directed to a device for automatically detecting the usage of automobile seat belts and recording that usage over a predetermined period of time.

BACKGROUND OF THE INVENTION

It has been established that only approximately 15% of the American driving public wear their seat belts on a regular basis, despite the fact that the usage of seat belts has also been conclusively shown to prevent serious injuries resulting from automobile accidents. Legislation has been enacted requiring that seat belts be provided in all automobiles used in the United States and some jurisdictions have even contemplated the idea of enacting legislation requiring drivers to "buckle up" or be subject to a fine. Automobile manufacturers have used other methods and means to encourage seat belt usage including, prevention of engine starting until seat belts are buckled, warning lights, chimes or electronically generated voices as reminders to "buckle up". All of the above activities, both the legislation actions and reminder devices, have failed to significantly encourage the driving public to use their seat belts. As a result, the insurance industry continues to settle millions of dollars of claims each year which could have been prevented.

SUMMARY OF THE INVENTION

The present invention has been developed to encourage the driving public to use their seat belts. As noted above, the invention is directed to a method and device by which the usage of automobile seat belts is automatically detected and recorded over a predetermined period of time, such as for example one year. The seat belts of the device contain switch contacts so that when the seat belt is buckled, an electric circuit is completed. After a delay, in a preferred embodiment five minutes, the fact that the seat belts have been buckled is counted by a counter and upon the seat belts being unbuckled the counter provides its output to a storage unit.

The storage unit, in the preferred embodiment, is designed to operate in conjunction with a magnetic card so that its contents, i.e., the number of bucklings of the seat belts can be obtained from the magnetic card which is inserted into the storage unit.

As noted above, the device and method are used to encourage drivers to use their seat belts. For example, after a one year period of use the magnetic card is removed from the storage unit and forwarded to the driver's insurance company which verifies usage of the seat belts at a predetermined level. If the driver has used the seat belts as promised, i.e., above the aforementioned predetermined level, then the driver earns an insurance policy discount. A personal computer with a card reading device can be used by the insurance company to obtain the usage data recorded on the magnetic card. Since the above-described system and method is operated in conjunction with a monetary reward to those using their seat belts, i.e., a discount on the driver's insurance policy, seat belt usage is effectively encouraged.

DETAILED DESCRIPTION OF THE INVENTION

Figure 1:
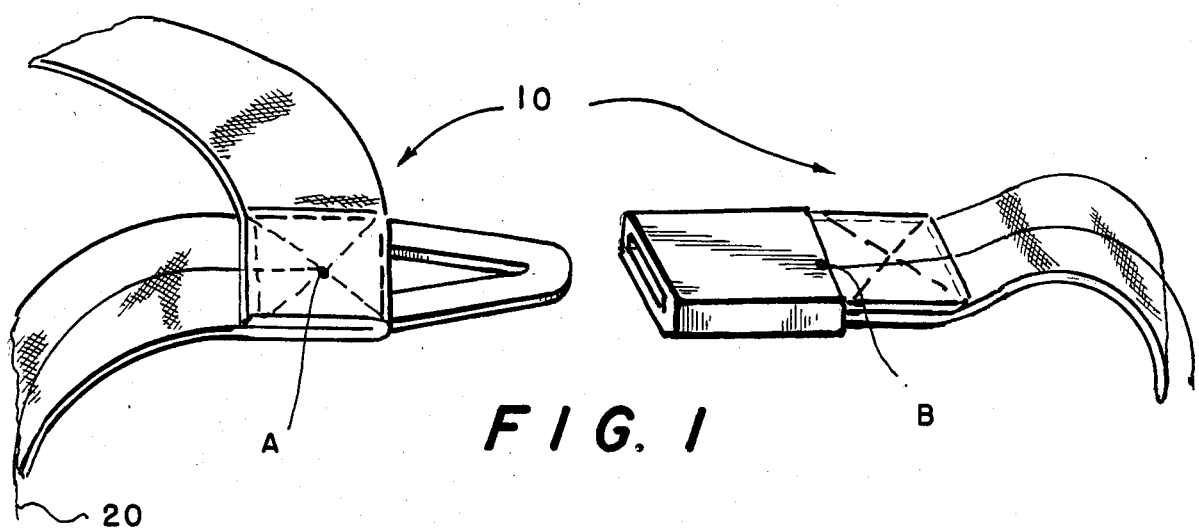
FIG. 1 shows the driver's seat belt used in the present invention.

FIG. 1 shows the driver's seat belt 10 used in the present invention. Switch contacts A and B make electrical contact when seat belt 10 is buckled. Wires 20 connected to switch contacts A and B are used to couple the switch contacts A and B to the remaining components of the present invention, as will be described below.

Figure 2:
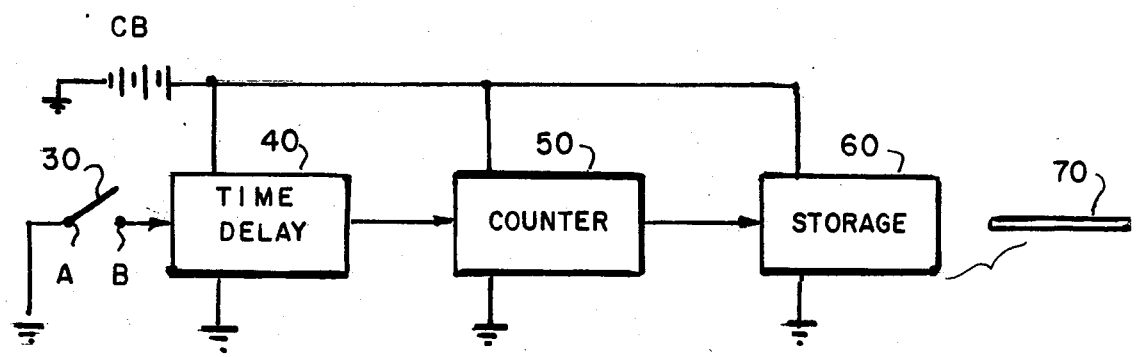
FIG. 2 is a schematic block diagram of the present invention.

FIG. 2 shows the components of the present invention in block form. For example, switch 30, comprising switch contacts A and B is shown connected to time delay 40. Time delay 40 is connected to counter 50 which is in turn connected to storage 60. The car battery CB provides power to each one of components 40-60. Further, storage 60 can include a fail safe rechargeable nicad battery assembly to safeguard its contents even when the main car battery is being changed out.

In operation, each time a driver buckles his seat belt, switch 30 is closed. The switch 30 closures are counted by a conventional counter 50, thereby allowing the total number of closures for a given period of time, typically a year, to be determined. However, this number would indicate switch closures only, not the true number of times that the seat belt was actually used. Since the shortest trip that the average driver is likely to make would be at least five minutes in duration, time delay 40 is inserted between switch 30 and counter 50. In this manner, should a driver attempt to increase the count by rapidly buckling and unbuckling the belt, the counter would still only register one count every five minutes. Furthermore, should the driver elect to buckle the seat belt and then stuff it under the seat, counter 50 would never reach but a count of one, as it is so wired as to have to be reset by the delay circuitry before it can receive another count.

The aforementioned reset action occurs only after switch 30 has been closed (i.e., buckling of the seat belt) and then opened again after an at least five minute delay. The registered output from counter 50 is then fed to storage 60 wherein the total number of "buckle ups" can be retained for future access.

In a preferred embodiment for operating the system, after the electronic equipment described above has been installed in a driver's vehicle, the driver is issued an electronic identity card 70 similar in appearance to a conventional credit card. It contains a magnetic tape on which information such as the driver's name, vehicle identification number, date of installation and number of "buckle up" counts assigned for the first year of operation are recorded. At the end of the predetermined usage period, namely, one year, the identity card 70 is inserted into storage 60 and the total count for the year is magnetically encoded on the card.

Figure 3:
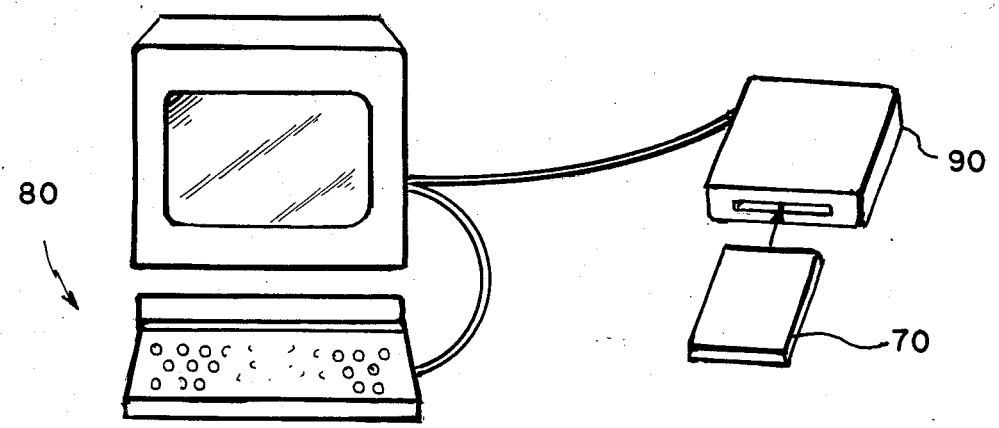
FIG. 3 shows the personal computer and card reader used to obtain and verify information recorded on the card shown in FIG. 2.

FIG. 3 shows a conventional personal computer, such as one manufactured by IBM or Apple, which has been connected to a magnetic card reader 90. The personal computer is programmed so that when the driver's card 70 is inserted into the card reader 90, the pertinent information described above is displayed on the associated CRT screen where it can be verified and from which it can be hard or soft copied. The equipment in FIG. 3 can be typically located at the office of an insurance company which serves the particular driver in question.

Accordingly, on or before the renewal date of the driver's vehicle insurance, the driver's card 70 can be inserted into the card reader 90 and information entered including the number of buckle ups the driver agrees to make for the ensuing year. Since the average driver will use his vehicle at least twice a day, the minimum number of buckle ups or counts to be entered would be at least 730. Other drivers, especially those who are frequent drivers and make regular use of their seat belts, will agree to a larger number to be entered for their account. The incentive for the driver to commit to the regular use of a seat belt is to be financial, as has been described above. For example, the insurance company can agree to reduce the yearly premium in accordance with the number of times that the driver agrees to buckle up. The premium savings can be credited at the end of the year, provided that the driver does, in fact, use the seat belt the number of times that has been agreed upon.

Thus, after the driver has agreed with the insurance company to enter into the above-described agreement, the equipment described above and shown in FIG. 2 can be installed into the automobile and at the discretion of the insurance company a refundable deposit may be charged to cover the cost of the equipment. After the equipment has been installed and tested, the driver is only required to return, at the anniversary date of the policy, the card 70 which has been encoded with the seat belt usage over the predetermined period of time. Upon receipt of the card 70 the insurance company verifies the usage of the seat belts using the equipment previously described with respect to FIG. 3. If the count determined is that which had been agreed upon, then the driver receives the predetermined amount of savings on the next year's policy. Of course, if the count is not verified then no credit is given.

Although the present invention has been described as a means for automatically determining the usage of seat belts for the general driving public, it is by no means limited to this use. Companies with large vehicle usage by employees, may well use such a tool as an internal audit procedure to promote safety and, in turn, award prizes or special bonuses to drivers with the highest buckle up count per miles driven.

The most important result of the usage of the present invention would be the reduction of accidents and injuries caused by non-use of seat belts. The insurance companies could well afford to reduce their premiums and still maintain their profit levels through reduction of claim payments. It has already been determined that the usual alarms, warning signals, etc. have had very little effect on the driving public. Even legislation will not cause drivers to use their seat belts. A financial incentive would most probably be very effective as almost every driver feels that insurance premiums are too high.

It should be appreciated that the above described description of the presently preferred embodiment does not limit the scope of the present invention in any way, and that various changes and modifications may be made without departing from the spirit and scope of the present invention. For example, although the use of a magnetic card has been described, those skilled in the art would readily recognize that a cassette, floppy disk, etc. could also be effectively used for recording the usage of the driver's seat belt. Furthermore, the system could be adapted to also monitor the usage of passenger seat belts. And finally, various interlock schemes can be used, for example, the system could be interlocked to only record a buckle-up count if the car was not moving or if the buckling took place prior to the car having been started.

What is claimed is:

1. A seat belt usage recording system comprising:
   a driver's seat belt including electrical switch contacts wired into the buckle portions of the seat belt, said switch contacts being in electrical contact with each other when the seat belt is buckled;
   counting means coupled to said driver's seat belt for counting the number of times the driver's seat belt is buckled over a predetermined usage period;
   storage means for storing the count from said counting means; and
   time delay means operatively connected between said driver's seat belt and said counting means, said time delay means preventing said counting means from counting a buckled condition of said driver's seat belt unless said driver's seat belt remains buckled for a predetermined period of time.

2. A system as in claim 1, wherein said driver's seat belt has interwoven electrical wires connected to said electrical switch contacts.

3. A system as in claim 1, said storage means including means for recording the stored count onto a magnetic card.

4. A system as claimed in claim 3, further comprising means for reading said magnetic card and displaying and recording said stored count.

5. A method for determining seat belt usage, comprising the steps of:
   detecting each time a driver's seat belt is buckled and outputting a detection signal while said driver's seat belt is buckled;
   generating a delayed record signal in response to said detection signal being maintained for a predetermined period of time; and
   recording said delayed record signal.

* * * * *